(12) United States Patent  
Naskali

(10) Patent No.: US 8,277,246 B2  
(45) Date of Patent: Oct. 2, 2012

(54) BATTERY TERMINAL ADAPTER

(75) Inventor: Matti Juhani Naskali, Tokyo (JP)

(73) Assignee: Nokia Corporation, Espoo (FI)

( * ) Notice: Subject to any disclaimer, the term of this patent is extended or adjusted under 35 U.S.C. 154(b) by 138 days.

(21) Appl. No.: 12/957,737

(22) Filed: Dec. 1, 2010

(65) Prior Publication Data

US 2012/0142221 A1    Jun. 7, 2012

(51) Int. Cl.  
*H01R 3/00* (2006.01)

(52) U.S. Cl. ........................................ 439/500; 429/121

(58) Field of Classification Search .................. 439/500, 439/638, 754; 320/137; 429/121  
See application file for complete search history.

(56) References Cited

U.S. PATENT DOCUMENTS

| 3,783,439 | A | 1/1974 | Valentino | 339/234 |
| 5,012,220 | A | 4/1991 | Miller | 340/311.1 |
| 7,180,265 | B2 | 2/2007 | Naskali et al. | 320/108 |
| 2008/0203972 | A1 | 8/2008 | Sather et al. | 320/137 |
| 2011/0050164 | A1* | 3/2011 | Partovi et al. | 320/108 |

FOREIGN PATENT DOCUMENTS

| CN | 201352802 Y | 11/2009 |
| WO | WO 2009/155698 A1 | 12/2009 |
| WO | WO 2010/129369 A2 | 11/2010 |

* cited by examiner

*Primary Examiner* — Khiem Nguyen  
(74) *Attorney, Agent, or Firm* — Harrington & Smith

(57) ABSTRACT

An apparatus including a battery having first and second battery terminals; and an electrical connector adapter. The electrical connector adapter includes a first and second adapter terminals. The first adapter terminal has a first contact area on the first battery terminal at the first side of the battery and a second contact area on a second side of the battery. The second adapter terminal has a first contact area on the second battery terminal at the first side of the battery and a second contact area on the second side of the battery. The adapter is configured to allow first contacts to electrically connect to the first and second battery terminals through the first contact areas. The adapter is configured to allow second contacts to electrically connect to the second contact areas and be connected by the electrical connector adapter to the first and second battery terminals.

22 Claims, 12 Drawing Sheets

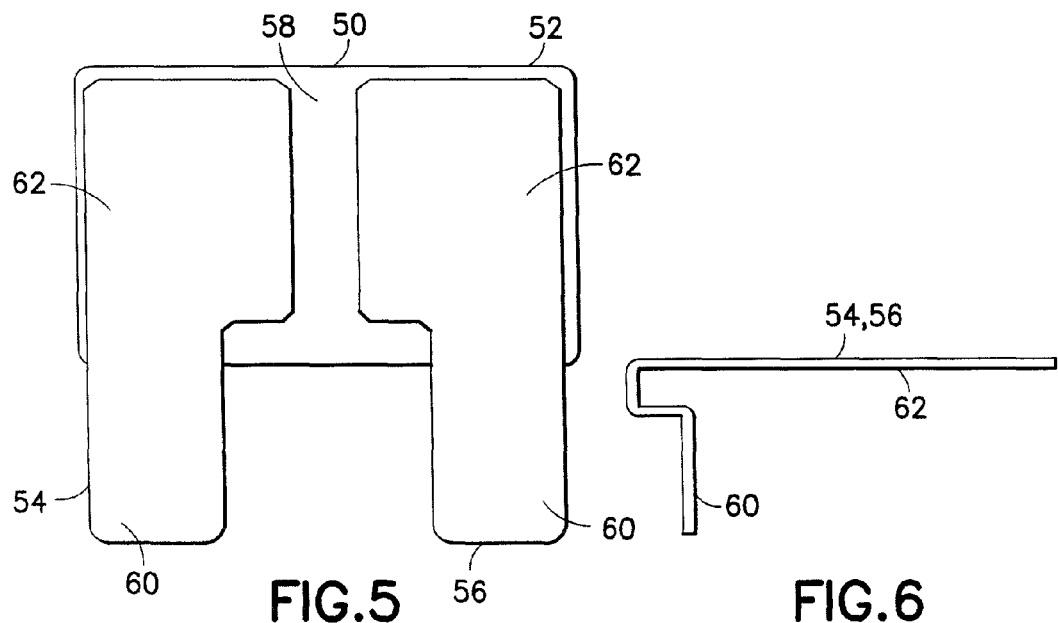
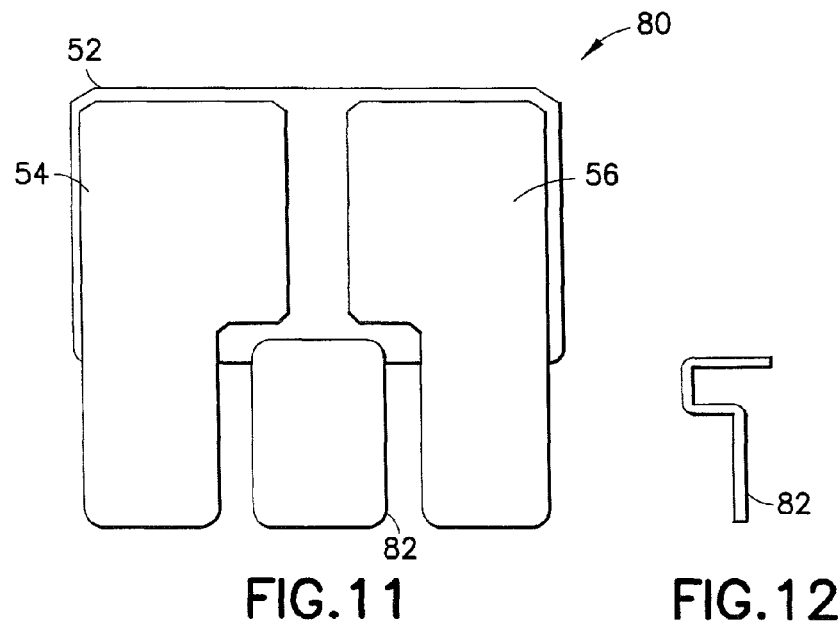

BATTERY TERMINAL ADAPTER

BACKGROUND

1. Technical Field

The example embodiments relate to a battery and, more particularly, to connection of battery terminals of a battery to contacts.

2. Brief Description of Prior Developments

Rechargeable batteries are used in a variety of portable hand held apparatus, such as mobile telephones for example. Contact pads of terminals of the battery have been provided on an end of the battery pack. Spring contacts in the apparatus can contact the contact pads. Some contact pads are known which extend around a corner so as to be located at two sides of the battery. A battery cover keeps the battery pack in a housing of the apparatus.

The battery is normally recharged by connecting the apparatus to a source of electricity, such as an electrical outlet in a wall or in an automobile. However, use of a wireless charging feature (such as by induction for example) and use of a solar panel charging feature for recharging a rechargeable battery are also known.

SUMMARY

The following summary is merely intended to be exemplary. The summary is not intended to limit the scope of the claimed invention.

In accordance with one aspect, an apparatus is provided comprising a battery comprising first and second battery terminals located only at a first side of the battery; and an electrical connector adapter connected to the battery. The electrical connector adapter comprises a first adapter terminal and a second adapter terminal. The first adapter terminal has a first contact area on an exterior side of the first battery terminal at the first side of the battery and a second contact area on an exterior side of a second side of the battery. The second adapter terminal has a first contact area on an exterior side of the second battery terminal at the first side of the battery and a second contact area on the exterior side of the second side of the battery. The electrical connector adapter is configured to allow first contacts to electrically connect at the first side of the battery to the first and second battery terminals through the first contact areas. The electrical connector adapter is configured to allow second contacts to electrically connect to the second contact areas at the second side of the battery and be connected by the electrical connector adapter to the first and second battery terminals at the first side.

In accordance with another aspect; a device is provided comprising a first electrical terminal; a second electrical terminal; a substrate having the first and second electrical terminals partially on the substrate; and adhesive on the substrate. The first and second electrical terminals each have a general L shape with a first leg configured to be located on an exterior side of a respective battery terminal at a first exterior side of the battery and a second leg on the substrate to be supported with the substrate by a second exterior side of the battery. The adhesive is configured to fixedly connect the substrate to the second exterior side of the battery.

In accordance with another aspect; a method comprises locating an electrical connector adapter on a battery, the electrical connector adapter comprising a first electrical terminal, a second electrical terminal, and a substrate having the first and second electrical terminals partially on the substrate, the first and second electrical terminals each having a general L shape with a second leg on the substrate and a first leg located on respective battery terminals of the battery at a first exterior side of the battery; and fixedly connecting the electrical connector adapter to the battery such that the substrate and the second legs are supported on a second exterior side of the battery, and the first and second electrical terminals bend from the second exterior side of the battery to the first exterior side of the battery and onto exterior sides of the respective battery terminals of the battery.

BRIEF DESCRIPTION OF THE DRAWINGS

The foregoing aspects and other features are explained in the following description, taken in connection with the accompanying drawings, wherein:

FIG. 5 is a top plan view of the adapter shown in FIG. 4;

FIG. 6 is a side view of one of the adapter terminals shown in FIG. 5;

FIG. 11 is a top plan view similar to FIG. 5 of an alternate embodiment of the adapter;

FIG. 12 is a side view of one of the adapter terminals shown in FIG. 11;

DETAILED DESCRIPTION OF EMBODIMENTS

Figure 1:
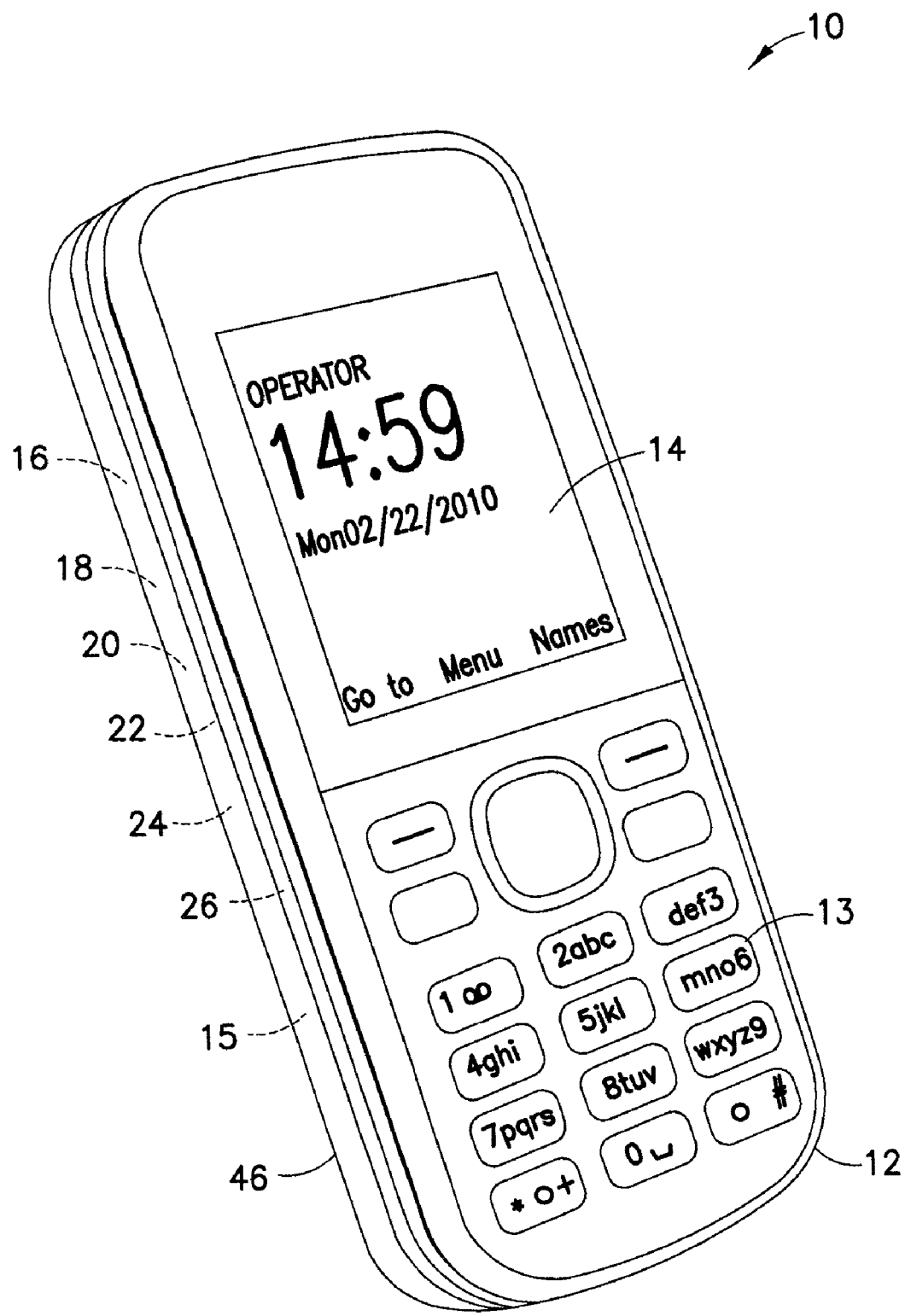
FIG. 1 is a perspective view of an apparatus.

Although the features will be described with reference to the example embodiments shown in the drawings, it should be understood that the features may be embodied in many alternate forms of embodiments. In addition, any suitable size, shape or type of elements or materials could be used.

Referring to FIG. 1, there is shown a perspective view of an apparatus 10 according to one example embodiment. In this example the apparatus 10 is a hand-held portable apparatus comprising various features including a telephone application, Internet browser application, camera application, video recorder application, music player and recorder application, email application, navigation application, gaming application, and/or any other suitable electronic device application. The apparatus may be any suitable portable electronic device, such as a mobile phone, computer, laptop, PDA, etc.

The apparatus 10, in this example embodiment, comprises a housing 12, a screen 14 which functions as a display, a keypad 13 which functions as a user input, and electronic circuitry including a printed wiring board 15 having at least some of the electronic circuitry thereon. The electronic circuitry can include, for example, a receiver 16, a transmitter 18, and a controller 20. The controller 20 may include at least one processor 22, at least one memory 24, and software. A rechargeable battery 26 is also provided. The screen 14 could be a touch screen such that it can function as both a display and a user input.

Figure 2:
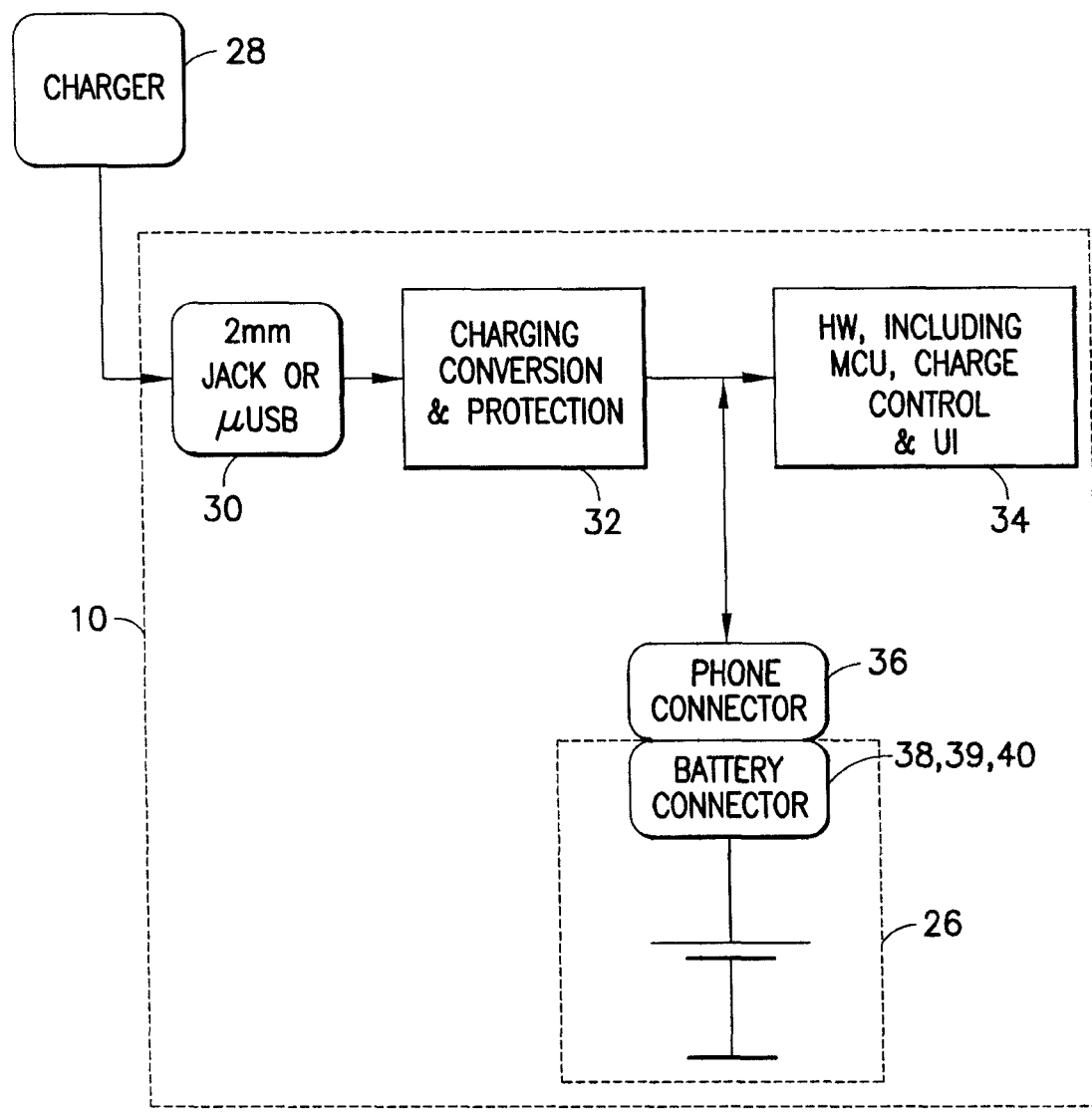
FIG. 2 is a diagram illustrating one method of charging the battery of the apparatus shown in FIG. 1.

Referring also to FIG. 2, a charger 28 can be removably connected to a connector 30 of the apparatus 10, such as a power jack or a micro-USB connector for example. The charger 28 can be plugged into a wall outlet or power outlet in an automobile for example. The apparatus 10 has a battery charging conversion and protection system 32, and suitable hardware 34 and software including a Master Control Unit (MCU), a battery charge control and a User Interface (UI) such as touch screen 14 for example. The battery charging conversion and protection system 32 and hardware 34 are connected to the battery 26 by a connector 36. The connector 36 may comprise spring contacts.

Figure 3:
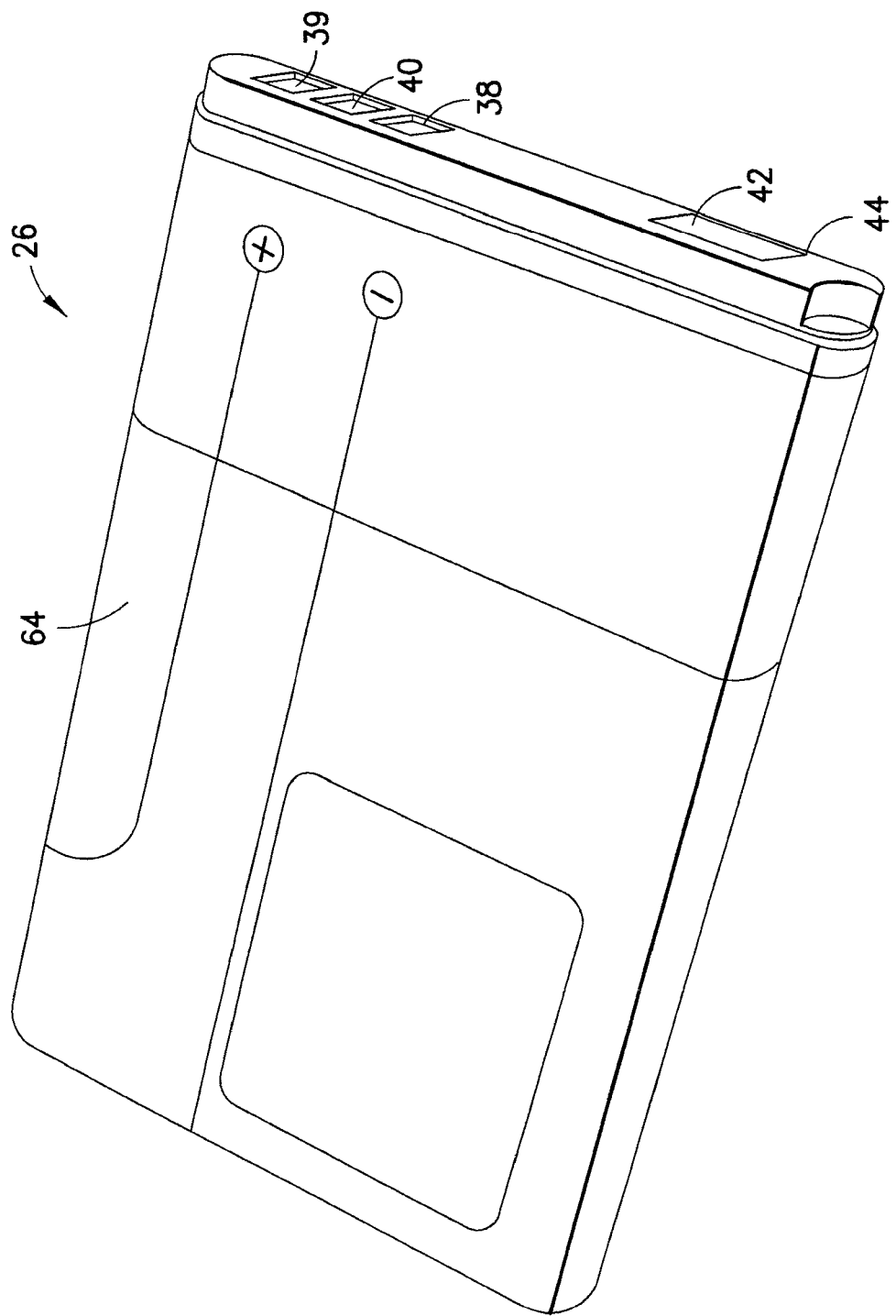
FIG. 3 is a perspective view of the battery used in the apparatus shown in FIG. 1.
Figure 4:
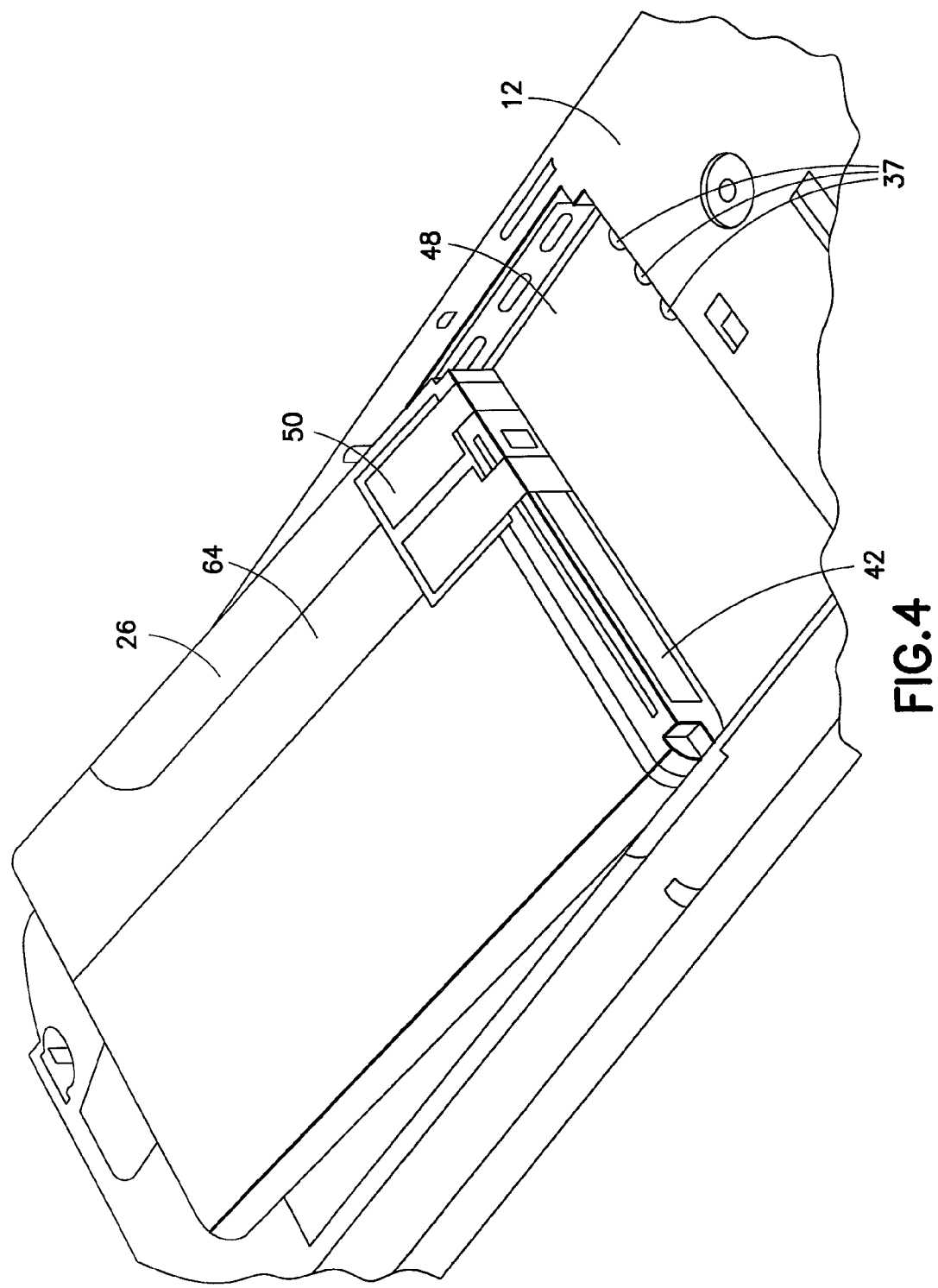
FIG. 4 is a partial perspective view of the apparatus shown in FIG. 1 with the back cover removed and the battery partially removed from a battery receiving area.

Referring also to FIG. 3, the battery 26 is a conventional battery having terminals 38, 39, 40 at a first side 42 only. The side 42 in this example embodiment is a narrow end of the battery; the battery having a general flat rectangular disk shape. The terminals 38-40 are stationary contact pads recessed in individual open windows of the housing 44 of the battery. Referring also to FIG. 4, the apparatus 10 is shown with its back cover or battery cover 46 (see FIG. 1) removed and the battery 26 partially removed. The housing 12 forms a battery receiving area 48. The spring contacts 37 of the connector 36 extend into the battery receiving area 48 at one end of the area 48. When the battery is fully inserted in the receiving area 48 the contacts 37 are aligned with the battery terminals 38-40.

Figure 7:
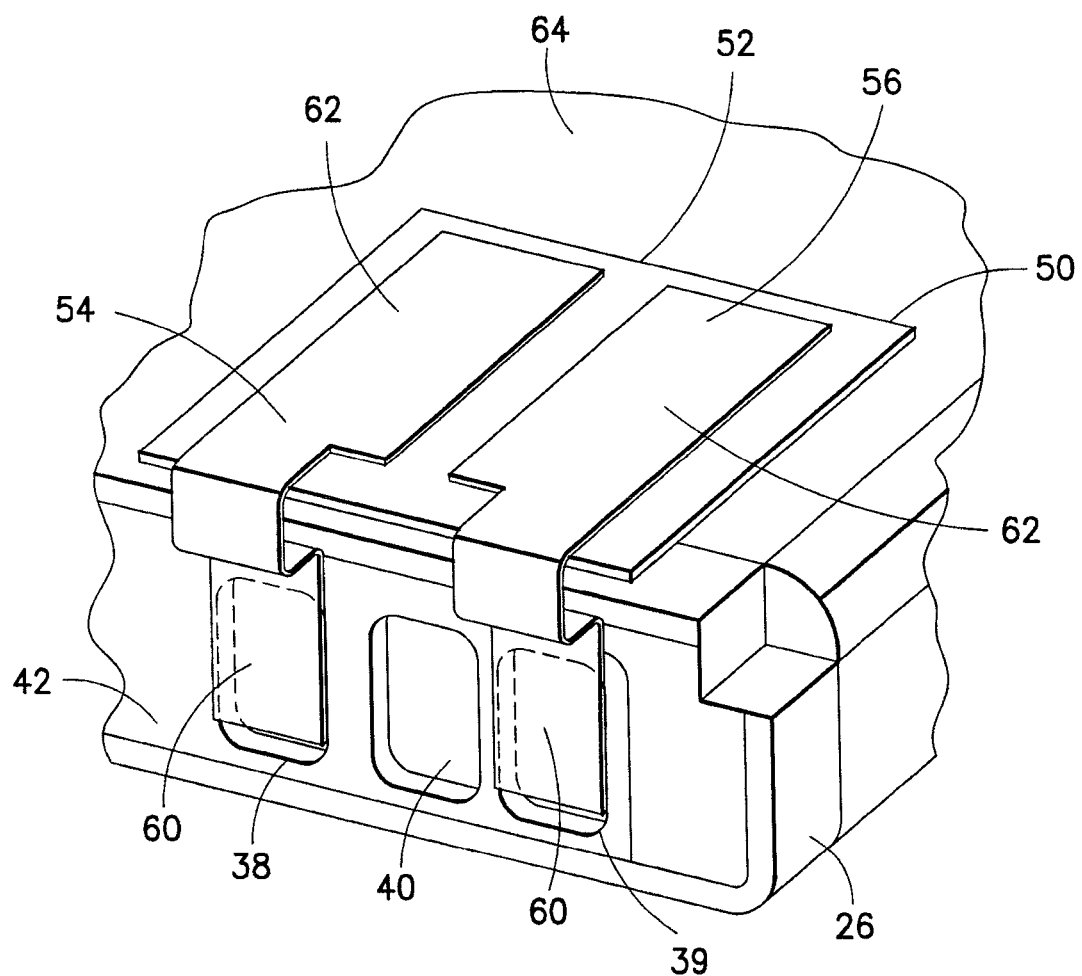
FIG. 7 is an enlarged partial perspective view of the battery and adapter shown in FIG. 4.

The apparatus 10 includes an electrical connector adapter 50 which is attached to the battery 26. Referring also to FIGS. 5-7, the adapter 50 comprises a base or substrate 52, a first adapter terminal 54 and a second adapter terminal 56. The substrate 52 is electrically non-conductive and mechanically connects the two terminals 54, 56 to each other. In this example embodiment the substrate 52 comprises a sheet of plastic film. However, any suitable substrate could be provided. The terminals 54, 56 are connected to a first side 58 of the substrate 52, such as with adhesive or by the substrate 52 being partially overmolded onto the terminals 54, 56. An opposite second side of the substrate 52 comprises adhesive.

The terminals 54, 56 are comprised of electrically conductive material, such as aluminum sheet metal or conductive polymer for example. The terminals 54, 56 have a general L shape with a first leg 60 and a second leg 62. The second legs 62 are on the substrate 52. The first legs 60 extend in a general cantilever fashion from the substrate 52. The adhesive on the second side of the substrate 52 is used to fixedly and stationarily connect the adapter 50 to a second side 64 of the battery 26 proximate the corner with the first side 42 at the battery terminals 38-40. Thus, the second legs 62 are supported on the second side 64 of the battery 26. The first legs 60 extend in front of and onto the first and second battery terminals 38, 39 at the windows through the battery housing 44. Thus, when the battery 26 is fully installed in the battery receiving area 48, the spring contacts 37 directly contact the first legs 60, press the first legs 60 against the first and second battery terminals 38, 39, and, hence, make electrical contact with the first and second battery terminals 38, 39 through the first legs 60.

Figure 8:
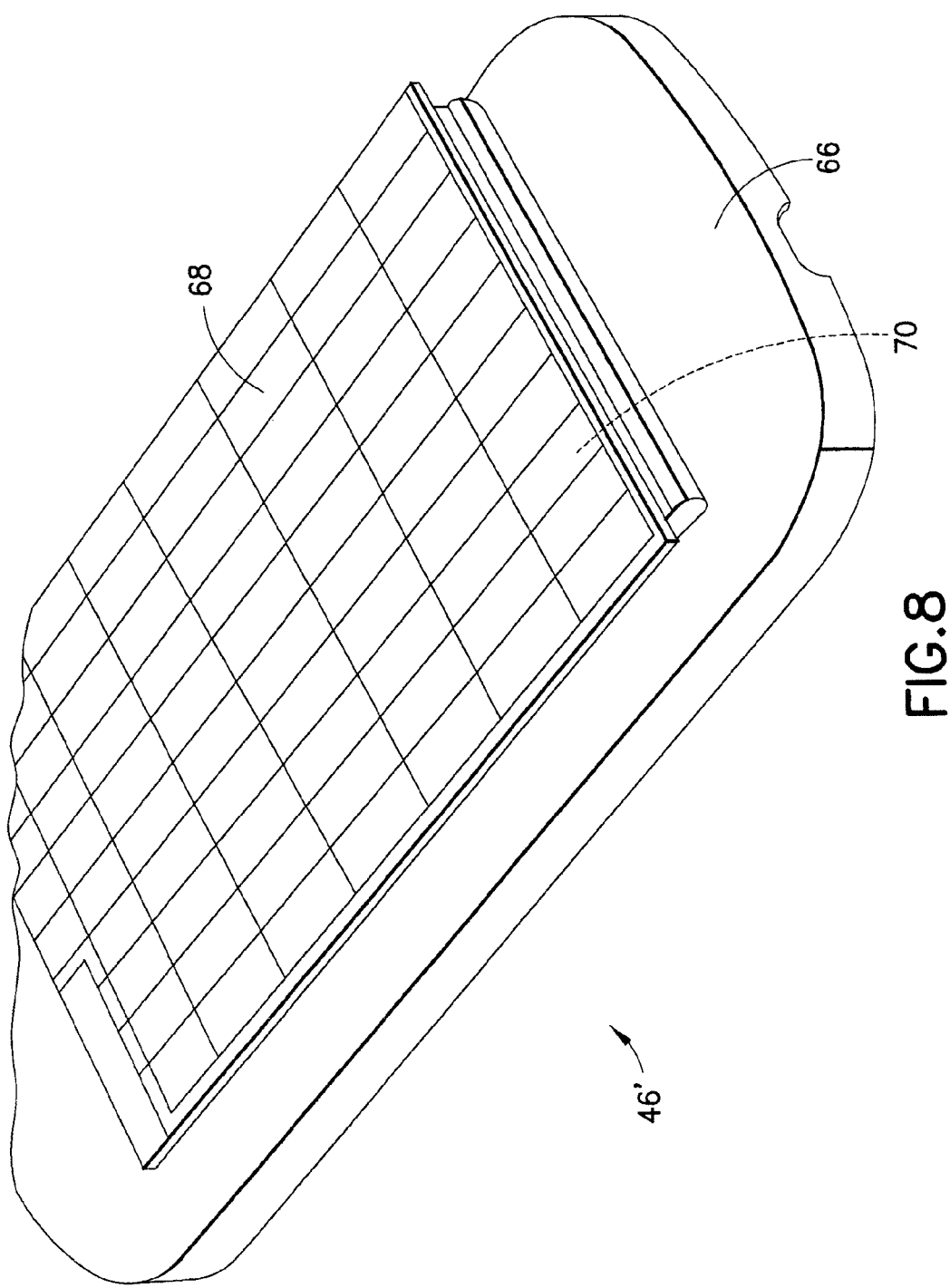
FIG. 8 is a partial perspective view of a back cover for the apparatus shown in FIG. 1.
Figure 9:
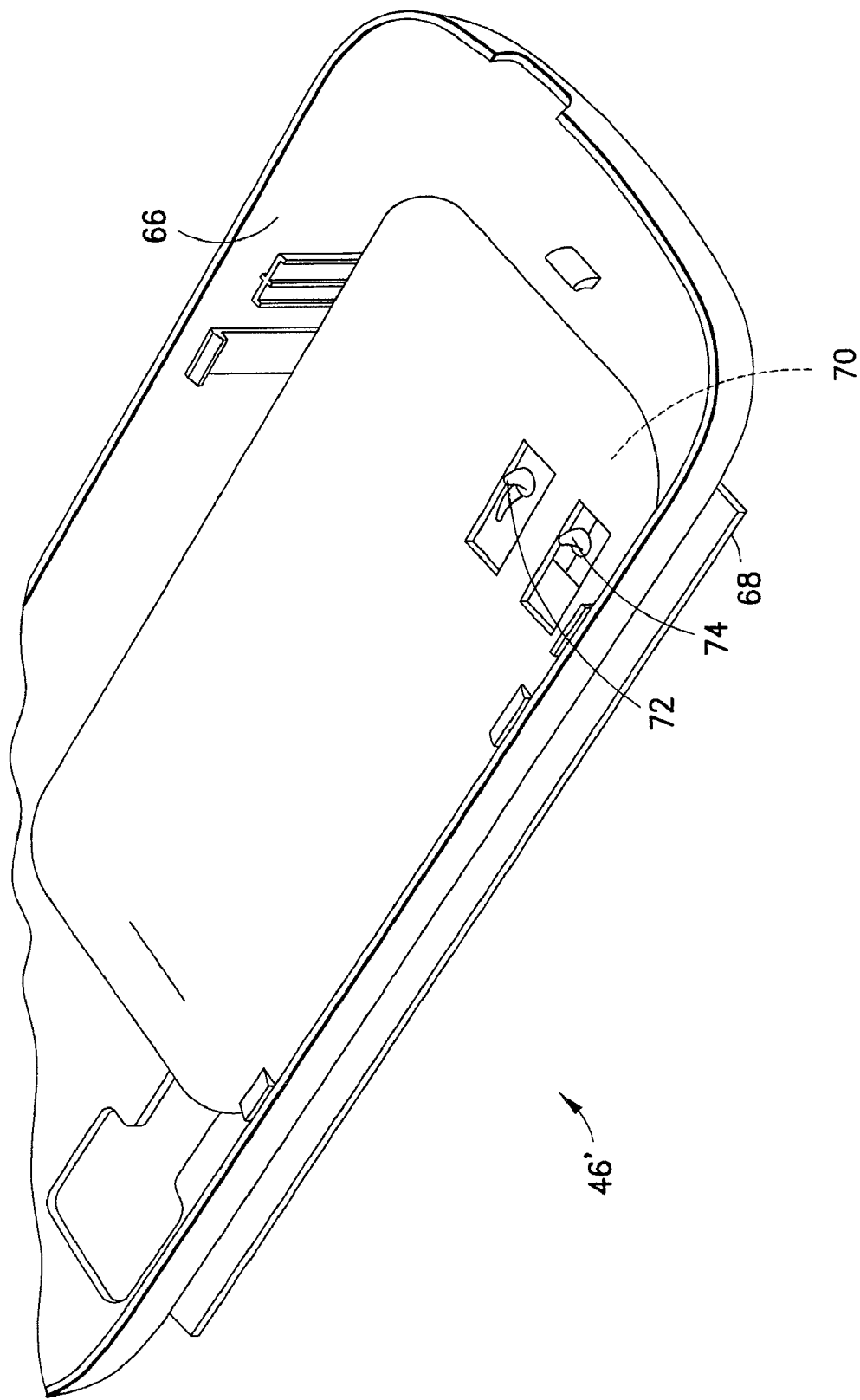
FIG. 9 is a partial perspective view of the rear side of the back cover shown in FIG. 8.
Figure 10:
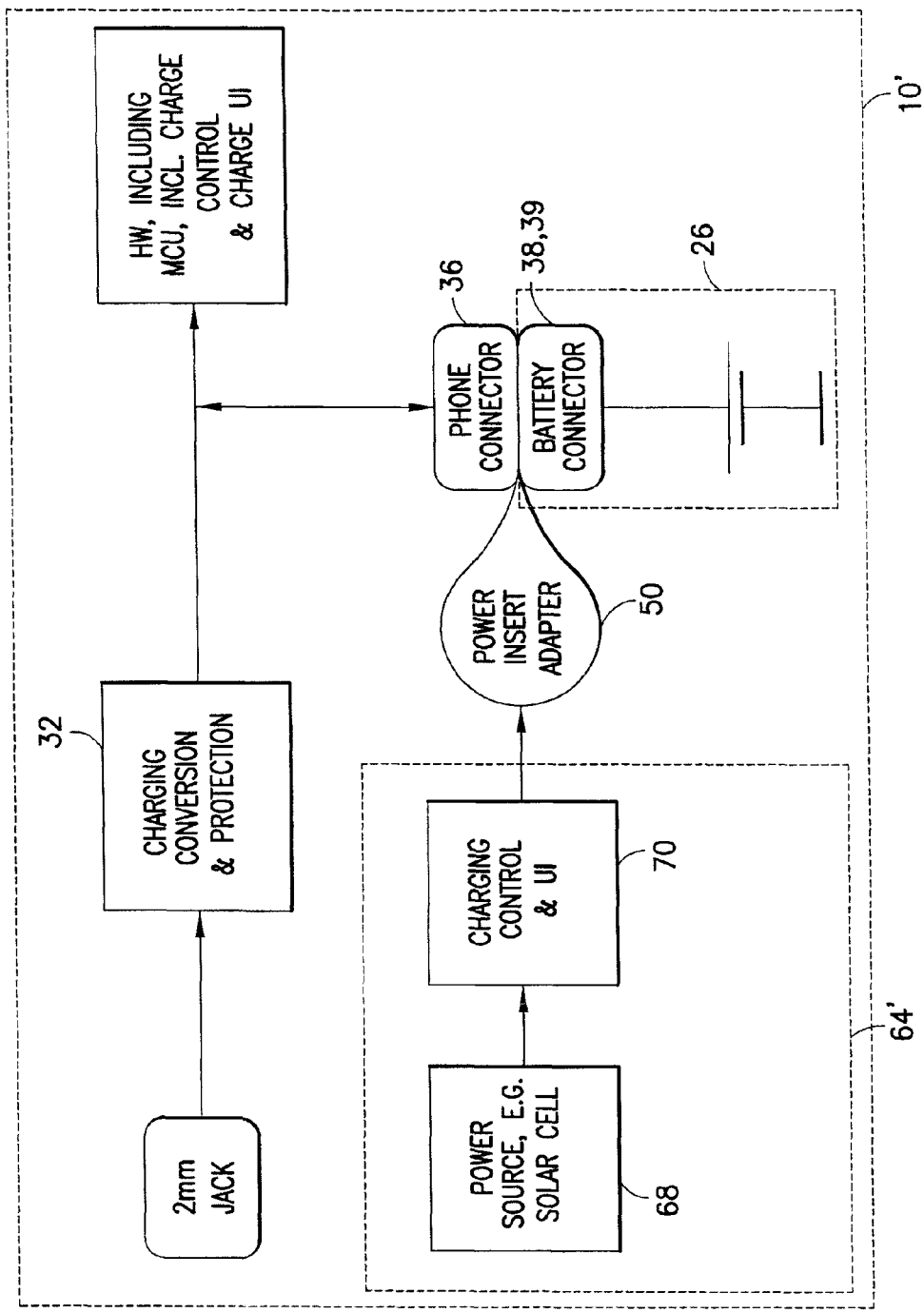
FIG. 10 is a diagram illustrating an apparatus with the back cover of FIGS. 8-9 attached.

Referring also to FIGS. 8-9, the battery cover 46 (see FIG. 1) can be removed and replaced with a different battery cover 46'. The cover 46' could be sold with the apparatus 10, or the cover 46' could be sold separately as an optional replacement cover. The cover 46 is merely a molded plastic member. However, the cover 46' includes a housing 66, a solar panel 68 and electrical circuitry 70. When connected to the housing 12, the cover 46' helps to form a new apparatus 10' as shown in FIG. 10. The housing 66 is substantially the same as the molded plastic member forming the cover 46, but includes holdings for attaching the solar panel 68 and electrical circuitry 70. The solar panel has solar cells and is mounted on the rear exterior side of the housing 66. The electrical circuitry 70, in this example embodiment, has electronics which can provide a charging control system and a user interface. The circuitry 70 also includes contacts 72, 74 for making electrical contact with the adapter 50.

When the cover 46' is attached to the housing 12, the contacts 72, 74 make direct contact with the top surfaces of the second legs 62 of the adapter terminals 54, 56. The contacts 72, 74 may be spring contacts, such as pogo pin contacts for example. Thus, the contacts 72, 74 and adapter terminals 54, 56 electrically connect the solar panel 68 and circuitry 70 to the battery 26 at the battery terminals 38, 39. As illustrated by FIG. 10, the adapter 50 allows both the contacts of the connector 36 and the contacts of the cover 46' to be connected to the battery terminals 38, 39 at the same time.

The example embodiment described above relates to design of an adapter 50 for a battery for use with a functional back cover. An example embodiment can supply an add-on functional cover to an apparatus such as a mobile phone. Phones typically have surface type battery terminals, which cannot be modified to have second access without loss of capacity and an increase in manufacturing cost. With an example embodiment a thin flexible adapter can be provided which allows current to flow between the phone and battery without disturbing the normal operation of the phone, but also allows a functional battery cover to connect to the battery with spring contacts such as pogo pins for example. With this adapter the basic phone and battery can be upgraded with a functional back cover (such as a solar charger back cover for example) having no impact to the rest of the phone design. A user can continue using an old battery by merely attaching the adapter 50 to the battery.

The adapter is simple. There is no need for the adapter to project out of the battery receiving area to the back cover. The design of the adapter does not sacrifice battery capacity. The control for the functional battery cover does not need to run through the electronics of the phone when charging the battery from the functional back cover. In one type of example embodiments the functional back cover can use, for example, wireless charging connectivity or solar panel connectivity.

In some cases the battery power needed to be accessed from the phone back cover. Usually this was done by adding another connector in the phone to access the battery. Another way to access battery power was to add a second connector to the battery; called a dual connector battery or double connector battery. However, there are drawbacks in the dual connector battery; namely, increase in manufacturing cost and a reduction in battery capacity as the connector takes more space.

The problem overcome by an example embodiment was to add a wireless charging feature or a solar back cover to an existing phone model to charge the phone battery directly without running the control through the rest of the electronics of the phone. Also, the same problem exists to get power from the battery to some accessory that is integrated into back cover; such as an electrical animated decoration for example. To add such a feature to an existing, old phone model requires connection in the battery pack. The problem is that a second connector would add cost and size (or reduce the active volume, thus capacity).

An example embodiment can use a thin flexible adapter to connect a recharging device, such as a solar panel for example, to the phone. The adapter can allow current to flow between the phone and battery without disturbing operation of the phone. Advantages include:

existing phone models can be provided with solar charging cover without extra cost in the basic phone;
existing batteries can be used;
no impact to the standard phone product;
enables accessory business for solar and wireless charging products for old phone products;
saves extra cost from the basic phone product, and instead provides wireless charging or solar charging as an option in an optional battery cover.

Referring also to FIGS. 11-12, an alternate embodiment of the adapter is shown. The adapter 80 in this embodiment is identical to the adapter 50, but includes a third adapter terminal 82 for the third battery terminal 40. In this example, the third adapter terminal 82 merely functions to allow uniform pressure of the contacts 37 with the adapter terminals against the battery terminals 38-40. The third adapter terminal 82 may not be used to make an electrical connection of the cover 46' with the battery 26. However, in an alternate embodiment the third adapter terminal could be sized and shaped to make electrical connection with not only one of the contacts 37 and battery terminal 40, but also a contact of the back cover.

Figure 13:
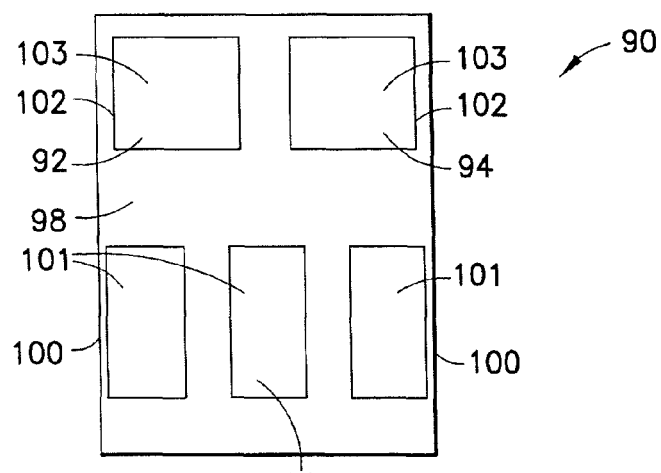
FIG. 13 is a plan top view of an alternate embodiment of the adapter before the adapter is attached to the battery.
Figure 14:
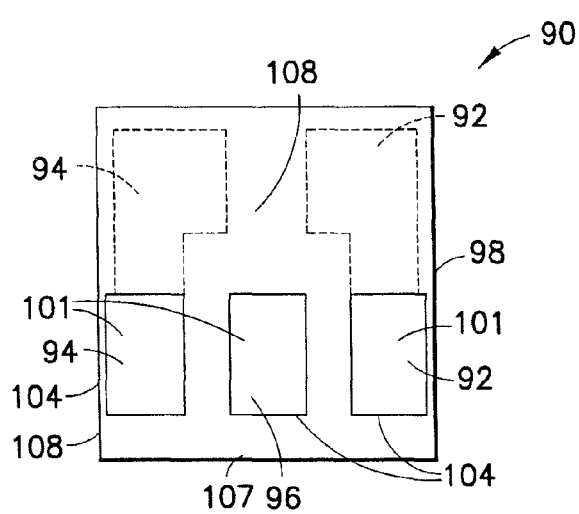
FIG. 14 is a plan bottom view of the adapter shown in FIG. 13.

Referring now also to FIGS. 13-14 another alternate embodiment is shown. In this embodiment the adapter 90 comprises a flex circuit having electrical conductors 92, 94, 96 and a flexible plastic substrate 98. The adapter could be a flexible foil circuit. The first conductor 92 forms the first adapter terminal similar to 54. The second conductor 94 forms the second adapter terminal similar to 56. The third conductor 96 forms the third adapter terminal similar to 82. The substrate 98 has windows 100, 102, 104 which expose the first and second contact areas 101, 103 of the conductors 92, 94, 96. At least a portion of the back side of the substrate 98 has adhesive 108 (see FIG. 14). Referring also to FIG. 3, when the adapter 90 is attached to the battery 26 the first contact areas 101 of the first legs of the adapter terminals 92, 94 and the terminal 96 are at the battery terminals on the first side 42, and the second contact areas 103 (for the electrically functional back cover) formed by the adapter terminals 92, 94 are located on the second side 64. If the cover 46 is used rather than the cover 46', it does not matter. The second contact areas 103 of the adapter terminals 92, 94 go unused, but the contacts 37 (see FIG. 4) are still connected to the battery terminals 38-40 through the first contact areas 101 of the first legs of the adapter terminals 92, 94 and the terminal 96. The first contact areas 101 can have a concave shape to project into the windows of the housing 44 at the battery terminals 38-40. With this embodiment a section 107 with adhesive 108 could wrap around to a third side of the battery (the side opposite the second side 64. Thus, the adhesive 108 could be used to securely attach the adapter to two or three sides of the battery; not just one side.

Figure 15:
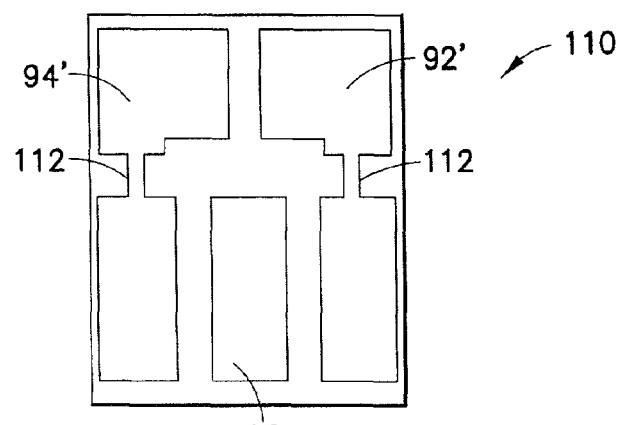
FIG. 15 is a diagram illustrating terminals of another alternate embodiment of the adapter.

Referring also to FIG. 15, another alternate embodiment of the adapter is shown. The adapter 110 is identical to the adapter 90 except for the shape of the first and second adapter terminals 92', 94'. The first and second adapter terminals 92', 94' each have a fuse section 112 with a reduced size. The fuse section 112 is adapter to function as a sacrificial overcurrent protection device. The metal strip 112 melts when too much current flows, which interrupts the circuit in which it is connected.

Figure 16:
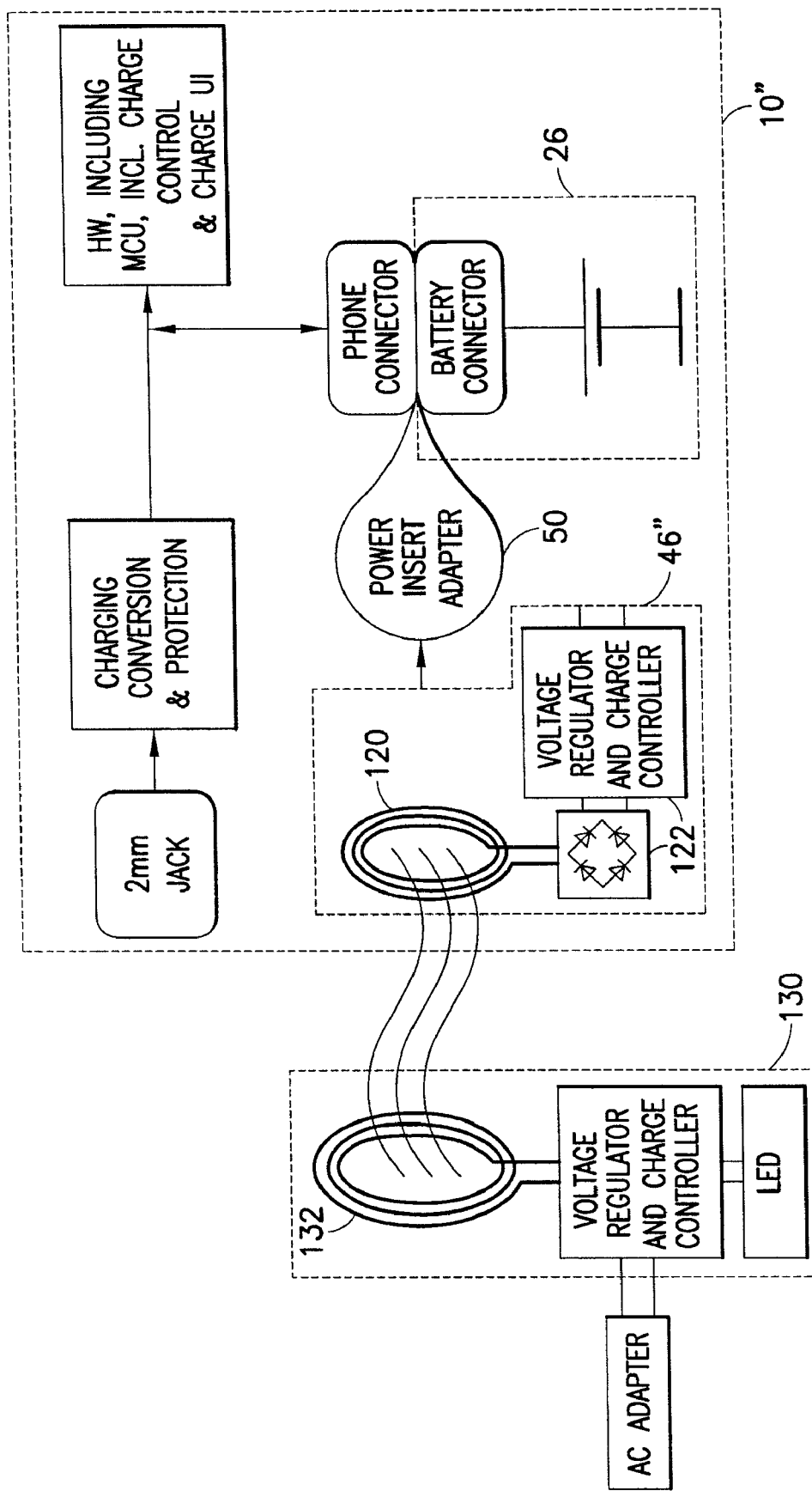
FIG. 16 is a diagram illustrating an apparatus with another embodiment of the back cover attached and an induction charger.

Referring also to FIG. 16 another alternate embodiment of the apparatus is shown. In the embodiment the apparatus 10" has a back cover 46" with a wireless magnetic induction coil 120 and electrical circuitry 122 including contacts adapted to connect to the second contact areas of the adapter terminals. Charging of a rechargeable battery by induction is described in U.S. Pat. No. 7,180,265 which is hereby incorporated by reference in its entirety. A wireless charging device 130, such as plugged into an AC wall outlet could be used to charge the battery 26, through the coil 120 and circuitry 122 of the back cover 46", by use of the induction coil 132. Thus, a contactless charging electric circuit can be connected with a functional back cover and power insertion adapter as a retro-fit add-on option to an existing phone. The Wireless Power Consortium sets international standards for compatible wireless charging stations. Compatible products are recognized by a logo. Phones, cameras, remote controls, and all mobile electronics carrying the logo work with all charging stations that carry the logo.

With an example embodiment, an apparatus 10, 10', 10" could be provided comprising a battery 26 comprising first and second battery terminals 38, 39 located only at a first side 42 of the battery; and an electrical connector adapter 50, 80, 90, 110 connected to the battery. The electrical connector adapter can comprise a first adapter terminal and a second adapter terminal. The first adapter terminal can have a first contact area on an exterior side of the first battery terminal 38 at the first side 42 of the battery and a second contact area on an exterior side of a second side 46 of the battery. The second adapter terminal can have a first contact area on an exterior side of the second battery terminal 38 at the first side 42 of the battery and a second contact area on the exterior side of the second side 46 of the battery. The electrical connector adapter can be configured to allow first contacts 37 to electrically connect at the first side 42 of the battery to the first and second battery terminals 38, 39 through the first contact areas. The electrical connector adapter can be configured to allow second contacts 72, 74 to electrically connect to the second contact areas at the second side 46 of the battery and be connected by the electrical connector adapter to the first and second battery terminals 38, 39 at the first side 42.

The first and second adapter terminals may comprise sheet metal members. The electrical connector adapter may comprise a substrate having portions of the first and second adapter terminals on a first exterior side of the substrate. The apparatus may further comprising means for stationarily connecting an opposite second side of the substrate to the second side of the battery, such as adhesive or another type of mechanical connection. The first and second adapter terminals may extend from the substrate in a general cantilever fashion. Adhesive could be provided on an opposite second side of the substrate which connects the electrical connector adapter to the battery. The first and second adapter terminals may have a general L shape with a first leg forming the first contact area and a second leg forming the second contact area. The first side of the battery may be orthogonal to the second side of the battery. The apparatus may further comprise a housing forming a battery receiving area; a battery cover connected to the housing to close the battery receiving area, where the battery is located in the battery receiving area, where the first contacts are connected to the housing and directly contact first sides of the first contact areas of the first and second adapter terminals, and opposite second sides of the first contact areas directly contact the first and second battery terminals, respectively, at an end of the battery receiving area, where the second contacts are connected to the battery cover, directly contact the second contact areas, and press the second contact areas towards the second side of the battery. The second contacts may comprise spring contacts. The battery cover may comprise a solar cell. The battery cover may comprise a power induction coil.

A device 50, 80, 90, 120 may be provided comprising a first electrical terminal; a second electrical terminal; a substrate having the first and second electrical terminals partially on the substrate; and adhesive on the substrate. The first and second electrical terminals may each have a general L shape with a first leg configured to be located on an exterior side of a respective battery terminal at a first exterior side of the battery and a second leg on the substrate to be supported with the substrate by a second exterior side of the battery. The adhesive may be configured to fixedly connect the substrate to the second exterior side of the battery. The first and second electrical terminals may comprise sheet metal. The first and second electrical terminals may extend from the substrate in a general cantilever fashion. The substrate may comprise a thin film substrate.

Figure 17:
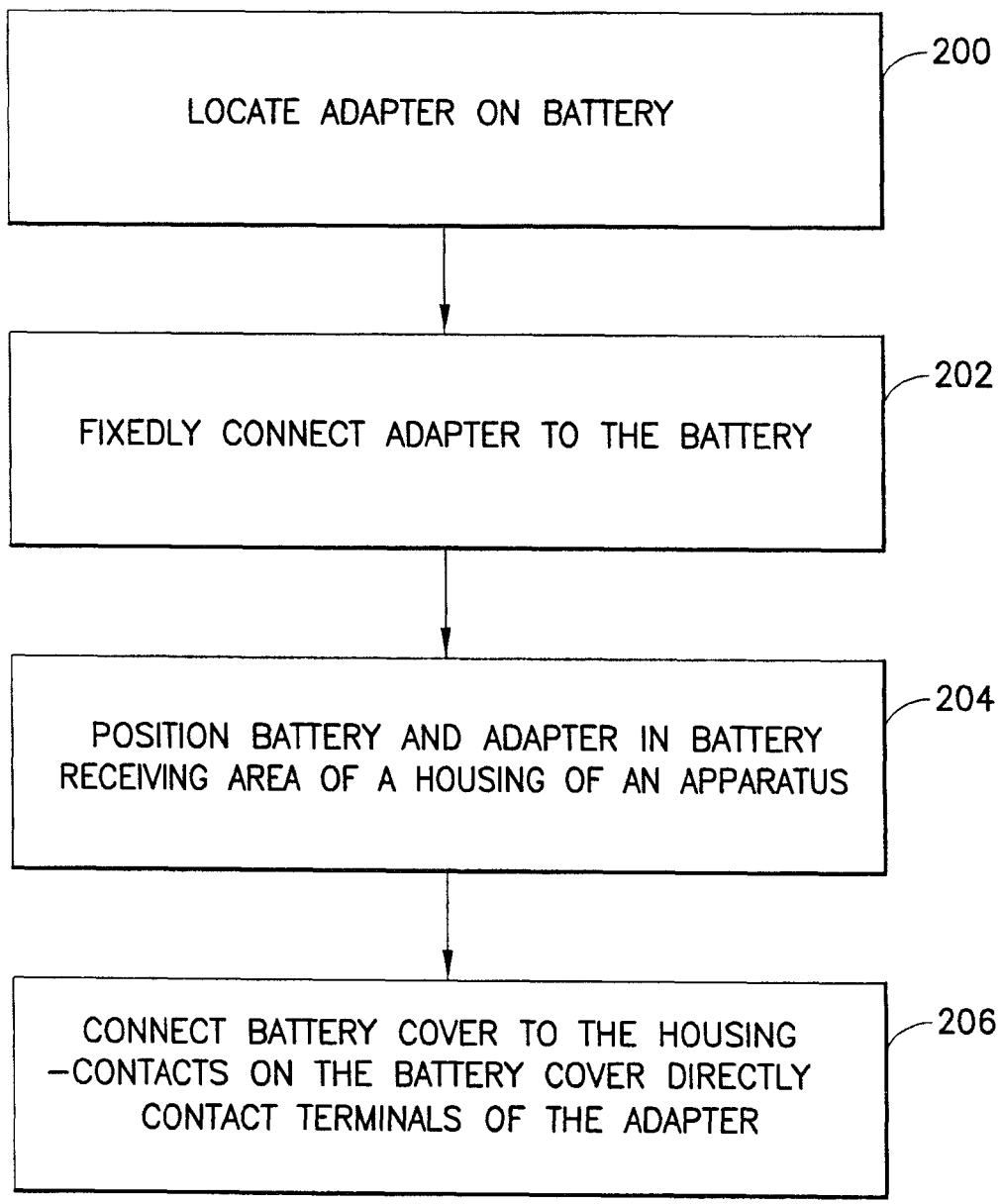
FIG. 17 is a diagram illustrating some steps of one example method.

A method may comprise locating an electrical connector adapter 50, 80, 90, 110 on a battery 26 as illustrated by block 200 in FIG. 17, the electrical connector adapter comprising a first electrical terminal, a second electrical terminal, and a substrate having the first and second electrical terminals partially on the substrate, the first and second electrical terminals each having a general L shape with a second leg on the substrate and a first leg located on respective battery terminals of the battery at a first exterior side of the battery; and fixedly connecting the electrical connector adapter to the battery as illustrated by block 202 such that the substrate and the second legs are supported on a second exterior side of the battery, and the first and second electrical terminals bend from the second exterior side of the battery to the first exterior side of the battery and onto exterior sides of the respective battery terminals of the battery. The method may further comprise positioning the battery 26 and electrical connector adapter 50, 80, 90, 110 in a battery receiving area 48 of a housing 12 of an apparatus as illustrated by block 204 with the first legs of the first and second electrical terminals being sandwiched between first contacts 37 of the apparatus and the battery terminals 38, 39 of the battery; and connecting a battery cover 46', 46" to the housing as illustrated by block 206 where second contacts 72, 74 on the battery cover directly contact the second legs at the second exterior side 46 of the battery.

One manufacturing method for contact parts is to stamp cut out of copper plate and form them to the shape of battery surface, and laminated on a board. The board may be, but doesn't need to be, provided with a tape surface underneath to stick on the battery. The contacts can be made by Flexible Printed Wire Board manufacturing process on a polyimide substrate. A battery modification solution can be provided for allowing use of a functional back cover with current portable apparatus, such as existing mobile telephones. The power insert adapter allows the user to add the functional back cover without buying a new battery. There is no connection to the adapter when battery is detached from the phone.

A typical mobile phone charger connection as similar to FIG. 2 has limitations for energy harvesting use due to poor efficiency at low power; the charging conversion has losses typically 10 to 50% of the input power, and the charge control consumes 10 to 60 mA (40 to 200 mW) regardless how much the input power is. For a solar harvesting point of view, this means that whenever a shadow or other conditions reduce the available solar power below 200 to 40 milliWatt, depending on case, the phone discharges its battery instead of charging. Even when solar power is strong enough a major part of the energy is lost in the conversion.

When a charging control is optimized for solar power, and harvested energy is inserted directly to the battery, high efficiency can be achieved even on a cloudy day a little energy can be harvested. For example, 10 mA (such as collected over a full day) that could be lost (even in the best phone charging control) can power a stand-by mode of the phone for the following night.

An example embodiment can comprise, essentially, a cost effective and effective way to retro-fit functionality like wireless charging and solar charging (but is not limited to this).

It should be understood that the foregoing description is only illustrative of various features. Various alternatives and modifications can be devised by those skilled in the art without departing from the scope of the claims. For example, features recited in the various dependent claims could be combined with each other in any suitable combination(s). In addition, features from different embodiments described above could be selectively combined into a new embodiment. Accordingly, the scope of the claims is intended to embrace all such alternatives, modifications and variances.

What is claimed is:

1. An apparatus comprising:
   a battery comprising a first battery terminal and a second battery terminal located only at a first side of the battery; and
   an electrical connector adapter connected to the battery, the electrical connector adapter comprising a first adapter terminal and a second adapter terminal,
   the first adapter terminal having a first contact area on an exterior side of the first battery terminal at the first side of the battery and a second contact area on an exterior side of a second side of the battery,
   the second adapter terminal having a first contact area on an exterior side of the second battery terminal at the first side of the battery and a second contact area on the exterior side of the second side of the battery,
   the electrical connector adapter being configured to electrically connect first contacts positioned against the first contact areas at the first side of the battery to the first and second battery terminals through the first contact areas,
   the electrical connector adapter being configured to electrically connect second contacts positioned against the second contact areas at the second side of the battery to the first and second battery terminals at the first side.

2. An apparatus as in claim 1 where the first and second adapter terminals comprise sheet metal members.

3. An apparatus as in claim 1 where the first and second adapter terminals comprise electrically conductive polymer material.

4. An apparatus as claim 1 where the electrical connector adapter comprises a substrate having portions of the first and second adapter terminals on a first exterior side of the substrate.

5. An apparatus as in claim 4 further comprising means for stationarily connecting an opposite second side of the substrate to the second side of the battery.

6. An apparatus as in claim 4 where the first and second adapter terminals extend from the substrate in a general cantilever fashion.

7. An apparatus as in claim 4 further comprising adhesive on an opposite second side of the substrate which connects the electrical connector adapter to the battery.

8. An apparatus as in claim 1 where the first and second adapter terminals have a general L shape with a first leg forming the first contact area and a second leg forming the second contact area.

9. An apparatus as in claim 1 where the first side of the battery is orthogonal to the second side of the battery.

10. An apparatus as in claim 1 where the apparatus further comprises:
a housing forming a battery receiving area;
a battery cover connected to the housing to close the battery receiving area,
where the battery is located in the battery receiving area,
where the first contacts are connected to the housing and directly contact first sides of the first contact areas of the first and second adapter terminals, and opposite second sides of the first contact areas directly contact the first and second battery terminals, respectively, at an end of the battery receiving area,
where the second contacts are connected to the battery cover, directly contact the second contact areas, and press the second contact areas towards the second side of the battery.

11. An apparatus as in claim 10 where the second contacts comprise spring contacts.

12. An apparatus as in claim 10 where the battery cover comprises a solar cell.

13. An apparatus as in claim 10 where the battery cover comprises a power induction coil.

14. A device comprising:
a first electrical terminal;
a second electrical terminal;
a substrate having the first and second electrical terminals partially on the substrate; and
where the first and second electrical terminals each have a general L shape with a first leg configured to be located on an exterior side of a respective battery terminal at a first exterior side of the battery and a second leg on the substrate to be supported with the substrate by a second exterior side of the battery, and
where the device is configured to be fixedly connected to the second exterior side of the battery.

15. A device as in claim 14 where the first and second electrical terminals comprise sheet metal.

16. A device as in claim 14 where the first and second electrical terminals comprise electrically conductive polymer material.

17. A device as in claim 14 where the first and second electrical terminals extend from the substrate in a general cantilever fashion.

18. A device as in claim 14 where the substrate comprises a thin film substrate.

19. A device as in claim 14 further comprising adhesive on the substrate for connecting the device to the battery.

20. An apparatus comprising:
a battery comprising first and second battery terminals located only at a first side of the battery;
a device as in claim 14 directly connected to the battery, where the first electrical terminal is located against the exterior side of the first battery terminal and the second electrical terminal is located against the exterior side of the second battery terminal, where the first and second battery terminals extend from the first and second battery terminals to the substrate on the second exterior side of the battery generally orthogonal to the first side of the battery.

21. A method comprising:
locating an electrical connector adapter on a battery, the electrical connector adapter comprising a first electrical terminal, a second electrical terminal, and a substrate having the first and second electrical terminals partially on the substrate, the first and second electrical terminals each having a general L shape with a second leg on the substrate and a first leg located on respective battery terminals of the battery at a first exterior side of the battery; and
fixedly connecting the electrical connector adapter to the battery such that the substrate and the second legs are supported on a second exterior side of the battery, and the first and second electrical terminals bend from the second exterior side of the battery to the first exterior side of the battery and onto exterior sides of the respective battery terminals of the battery.

22. A method as in claim 21 further comprising:
positioning the battery and electrical connector adapter in a battery receiving area of a housing of an apparatus with the first legs of the first and second electrical terminals being sandwiched between first contacts of the apparatus and the battery terminals of the battery; and
connecting a battery cover to the housing where second contacts on the battery cover directly contact the second legs at the second exterior side of the battery.

\* \* \* \* \*